(12) United States Patent
Sharman (10) Patent No.: US 10,799,904 B2
(45) Date of Patent: Oct. 13, 2020

(54) PIPE SPRAY MACHINE

(71) Applicant: Field Joint Coatings Pty Ltd, Brisbane (AU)

(72) Inventor: Aaron Sharman, Brisbane (AU)

(73) Assignee: Field Joint Coatings Pty Ltd, Brisbane (AU)

( * ) Notice: Subject to any disclaimer, the term of this patent is extended or adjusted under 35 U.S.C. 154(b) by 279 days.

(21) Appl. No.: 15/566,374

(22) PCT Filed: Apr. 7, 2016

(86) PCT No.: PCT/AU2016/050253
§ 371 (c)(1),
(2) Date: Oct. 13, 2017

(87) PCT Pub. No.: WO2016/164967
PCT Pub. Date: Oct. 20, 2016

(65) Prior Publication Data
US 2018/0111150 A1    Apr. 26, 2018

(30) Foreign Application Priority Data

Apr. 14, 2015 (AU) .................... 2015201875

(51) Int. Cl.
| B05B 13/04 | (2006.01) |
| F16L 58/02 | (2006.01) |
| F16L 58/18 | (2006.01) |
| B05D 1/02 | (2006.01) |

(52) U.S. Cl.
CPC ...... B05B 13/0436 (2013.01); B05B 13/0421 (2013.01); B05D 1/02 (2013.01); F16L 58/02 (2013.01); F16L 58/18 (2013.01)

(58) Field of Classification Search
None
See application file for complete search history.

(56) References Cited

U.S. PATENT DOCUMENTS

| 4,595,607 A | 6/1986 | Betteridge et al. |
| 6,589,346 B2 | 7/2003 | Schick et al. |
| 2003/0017275 A1 | 1/2003 | Schick et al. |
| 2011/0159192 A1* | 6/2011 | Daykin ............... B05B 13/0436 427/314 |
| 2014/0370200 A1 | 12/2014 | Krutzen et al. |

FOREIGN PATENT DOCUMENTS

| WO | WO 2013/116646 | 8/2013 |
| WO | WO PCT/AU2016/050253 | 10/2016 |

OTHER PUBLICATIONS

WO PCT/AU2016/060253 Search Rept., dated Jun. 8, 2016, Field Joint Coatings Pty Ltd.
WO PCT/AU2016/050253 Writ. Opin., dated Jun. 8, 2016, Field Joint Coatings Pty Ltd.

* cited by examiner

*Primary Examiner* — Michael P. Rodriguez
(74) *Attorney, Agent, or Firm* — Wells St. John P.S.

(57) ABSTRACT

The invention relates to an apparatus for applying a coating to a pipe. The apparatus includes a mounting means for mounting the apparatus to the pipe, an applicator for applying the coating to the pipe and a moving means for moving the applicator relative to the mounting means and around the pipe.

21 Claims, 5 Drawing Sheets

ANTI-CLOCKWISE

PIPE SPRAY MACHINE

RELATED PATENT DATA

This application is a 35 U.S.C. § 371 of and claims priority to PCT International Application No. PCT/AU2016/0050253, filed 7 Apr. 2016, which was published in English, which claims priority to AU Application No. 2015201875, filed 14 Apr. 2015, and the teachings of which are incorporated herein by reference.

TECHNICAL FIELD

The present invention relates to applying a coating to a pipe, and in particular to an apparatus and method for applying a coating to a field joint.

BACKGROUND ART

It will be clearly understood that, if a prior art publication is referred to herein, this reference does not constitute an admission that the publication forms part of the common general knowledge in the art in Australia or in any other country.

A field joint is the area where two pipe joints meet and are welded together. The field joint is made up of bare steel and therefore susceptible to corrosion. In order to avoid creating corrosion-prone areas or cold spots in a pipeline, the join area must be protected against corrosion and thermally insulated after welding.

One way to protect field joints against corrosion is to apply an outer coating to the field joint. One method of applying a coating to a pipe is to manually apply the coating by painting multiple coats of a protective substance around each field joint.

However, manually applying multiple coatings is often cumbersome, particularly when applying a coating to large industrial pipes or pipelines. In addition, applying multiple coatings manually by hand is often labour intensive and time consuming. It is also difficult to apply each layer of the coating substance consistently around the entire pipe and prevent build-up of the coating solution in a single area.

SUMMARY OF INVENTION

The present invention is directed to an apparatus for applying a coating to a pipe, which may at least partially overcome at least one of the abovementioned disadvantages or provide the consumer with a useful or commercial choice.

According to one aspect of the present invention, there is provided an apparatus for applying a coating to a pipe, the apparatus including:

mounting means for mounting the apparatus relative to the pipe;

an applicator for applying the coating to the pipe; and, moving means for moving the applicator relative to the mounting means and around the pipe, the moving means defining a mouth for receiving the pipe and including a bridging means for at least partially bridging the mouth so that the applicator can apply coating to the pipe from one side of the mouth to the other.

Typically, the mouth is located towards the lower end of the moving means so that the apparatus may be located relative to the pipe from above. Advantageously, the mouth allows the apparatus to be lifted above a pipe and lowered onto a pipe such that the apparatus at least particularly surrounds the pipe.

Typically, the bridging means is in the form of a rotating member. Advantageously, the rotating member may bridge the mouth such that the applicator can move from one side of the mouth to the other.

Preferably, the moving means includes a rotating applicator support member for supporting rotation of the applicator 360 degrees around the pipe. Advantageously, the pipe can be coated with a coating solution at any point around the circumference of the pipe.

The applicator support member is typically in the shape of a sectional ring which at least partially defines the mouth of the moving means and rotates about the longitudinal axis of the pipe. The applicator support member may include a elongate groove along the outside of the member for location of a rope or band.

The applicator may be located at any point along the length of the applicator support member. However, preferably, the applicator is located at a mid-point along the length of the applicator support member.

The applicator may include a spray head for spraying the coating onto the pipe, in particular, an outer surface of the pipe. The spray head may be connected in communication with a reservoir containing the coating material.

The applicator support member may be the bridging means. Alternatively, another rotating member may be the bridging means relative to which the applicator support means is mounted.

Optionally, the moving means may further include at least one rotating intermediate member for mounting the applicator support member relative to the mounting means. Preferably, the at least one intermediate member is of a similar shape to the applicator support member and includes a similar groove feature.

The at least one intermediate member may be located between the applicator support member and the mounting means such that the applicator support member rotates relative to the intermediate member and the mounting means.

Optionally, the moving means include a pair of gears for varying the speed of rotation of the rotating applicator support member relative to the at least one rotating intermediate member. Advantageously, the speed of the applicator can easily be varied between various speeds.

Optionally, the rotating intermediate member may be the bridging means. In this instance, the rotating applicator support member may be moveably extendable from the at least one rotating intermediate member.

Preferably, the mounting means includes a fixed rail for mounting the bridging means relative to the pipe.

Preferably, the fixed rail and the bridging means are concentric sectional rings to facilitate rotation relative to one another. Typically, the fixed rail is of a complementary shape to the bridging means such that the bridging means may rotate relative thereto. Preferably, the bridging means includes an elongate groove for complimentary engagement with the fixed rail.

The moving means may further include a motor for moving the one or more of the members. The motor may be either a single speed or variable speed motor. However, preferably, the motor is a single speed motor.

The motor is preferably located at the top, front and centre of the apparatus. However, the motor may be located at any other location on the apparatus.

The moving means may further include one or more pulleys for transferring the drive of the motor to the one or more rotating members. Preferably, each rotating member is associated with a pulley in order to facilitate rotation of that member.

The mounting means may further include a ridge frame defining a channel for receiving the pipe. The frame preferably includes at a front panel and a rear panel and elongate members located in between. The frame may also include one or more braces for diagonally supporting the frame. Optionally, the frame may include additional panel portions to increase the rigidity of the frame.

The front panel may include an aperture for locating a motor. Preferably, the aperture is located top and centre of the front panel.

The mounting means may further include one or more adjustable spacers for spacing the pipe from the frame. The spacers are preferably located above the pipe such that the pipe can be made concentric with the channel of the frame and the rotating members of the moving means. Advantageously, this allows an even coating to be applied around the pipe.

The mounting means may further include one or more rams for fastening the pipe to the mounting means. Preferably, the mounting means includes two pairs of rams located under neither the pipe for compressing a bottom surface of the pipe toward the spacers. Typically, each ram corresponds to a spacer above to ensure even distribution of a clamping force over a lower surface of the pipe. The rams may be attached to the frame using any suitable fastening means, for example, bolting or welding.

The mounting means may include one or more shafts that extend outwardly from the front panel of the frame about which one or more rollers are mounted. Preferably, each shaft has a pair of rollers. However, each shaft may have one or more rollers, the number of rollers corresponding to the number of rotating members.

The one or more shafts are preferably located in a semi circle formation around an opening of the channel defined by the frame for locating the rotating members of the moving means relative to the pipe.

The apparatus may further include a controller for controlling the moving means so that each layer of coating is commenced at a different location on the pipe. Advantageously, commencing each new layer of coating at a different location prevents build up for the coating at a single location.

The controller may further be configured to control the apparatus so that each coating is applied greater than 360 degrees. Preferably, each coating is applied 361 degrees to ensure that the coating extends at least one full revolution around the pipe. Advantageously, this prevents areas of the pipe from remaining uncoated.

Preferably, the mounting means further includes an attachment means to facilitate attachment of the frame to a lifting apparatus. Preferably, the attachment means is in the form of a handle located towards the top and front of the frame. Alternatively, any other suitable attachment means could be used, for example a hook or a ring. Advantageously, the apparatus can be lifted using the attachment mean from an initial location, e.g. the back of a vehicle, and located relative to the pipe.

The apparatus may further include a coil induction device for heating the pipe. Preferably, the coil induction device is attachable and detachable from the fastening means. Advantageously, in environments where the pipe is required to be heated the coil induction device may be attached to the mounting means. Alternatively, in environments where the pipe does not require heating the coil induction device may be detached from the mounting means.

According to another aspect of the present invention, there is provided a method of applying a coating to a pipe, the method including:

mounting an applicator to the pipe; and moving the applicator around the pipe to apply the coating.

The step of mounting the applicator may involve compressing the pipe using rams. Preferably, the rams apply an upward pressure to the pipe which advantageously secures the pipe relative to a frame.

The step of moving the applicator may involve a series of sequences. Preferably, the step of moving the applicator involves at least a first sequence and a second sequence. The series of sequences will preferably involve alternating between the first sequence and the second sequence.

The first sequence may involve moving the applicator greater than 360 degrees to apply a layer of coating to the pipe. Preferably, the step of moving the applicator may involve moving the 361 degrees in a clockwise direction for spraying the pipe with a coating and a further 10 degrees in the same direction to relocate the applicator to a new location from which the second sequence may start.

The second sequence may involve the step of moving the applicator the applicator greater than 360 degrees in an opposite direction to apply another layer of coating to the pipe. Preferably, the step of moving the applicator may involve moving the 361 degrees in an anti-clockwise direction for spraying the pipe with a coating and a further 10 degrees in the same direction to relocate the applicator to a new location.

The method may further include the step of purging the flow line. Preferably, the flow line will be purged with an acid or solvent solution to clear the line of any buildup of coating within the flow line. Purging the flow line may involve moving the spray to a 90 degree position before activating a purge function on the controller and allowing an acid or solvent solution flow through and clear the line.

The method may further include the step of priming the flow line so that the coating flows through the flow line to the spray head. Priming the flow line may involve activating a primer function on the controller and allowing the coating to flow toward the spray outlet.

The reference to any prior art in this specification is not, and should not be taken as an acknowledgement or any form of suggestion that the prior art forms part of the common general knowledge.

Any of the features described herein can be combined in any combination with any one or more of the other features described herein within the scope of the invention.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
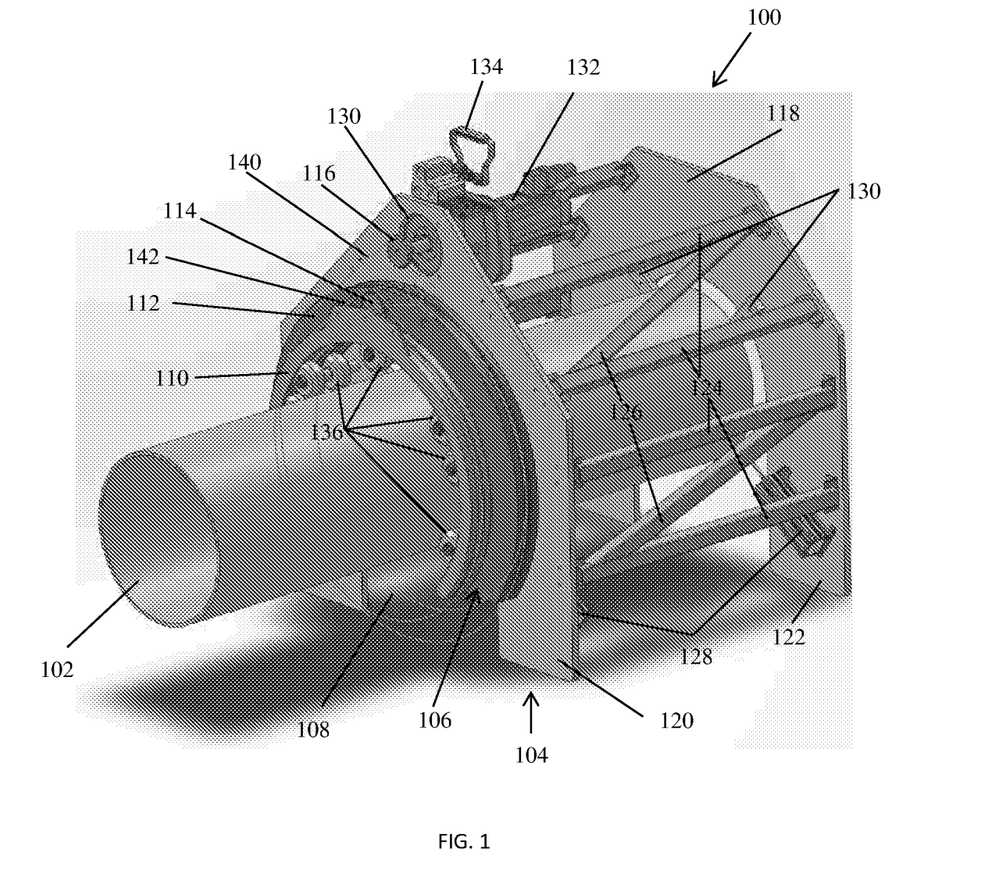
FIG. 1 is a side perspective view of a preferred embodiment of the present invention in a securing position.

According to a preferred embodiment of the present invention, there is provided an apparatus 100 for applying a coating to a pipe 102 as shown in FIG. 1. The apparatus 100 includes a mounting means 104 for mounting the apparatus 100 relative to the pipe 102. An applicator (not shown) is provided for applying the coating to the pipe 102. Further, a moving means 106 is provided for moving the applicator relative to the mounting means 104 and around the pipe 102.

As can be seen in FIG. 1, the moving means 106 defines a mouth 108 for receiving the pipe 102. The mouth 108 is located towards a lower end of the moving means 106 so that the apparatus 100 may be located relative to the pipe 102 from above. Advantageously, the mouth 108 allows the apparatus 100 to be lifted above a pipe 102 and lowered onto a pipe such that the apparatus at least particularly surrounds the pipe.

The moving means 106 includes an outer rotating applicator support member 110. The applicator support member is circular in shape having a cut out section for partially defining mouth 108 and comprises an elongate groove along the width for locating a cable or band. The applicator support member further includes mounting apertures 111 for mounting the applicator.

The applicator support member 110 supports rotation of the applicator 360 degrees around the pipe 102. Advantageously, the pipe 102 can be coated with a coating solution at any point around the circumference of the pipe.

The applicator (not shown) is located at a mid point on the applicator support member 110 and is mounted to the applicator support member 110 via mounting apertures 111. The applicator, however, may be located at any point along the length of the applicator support member 110.

The applicator may include a spray head (not shown) for spraying the coating onto the pipe 102, in particular, an outer surface of the pipe. The spray head may be connected in communication with a reservoir containing the coating material.

The moving means further includes a rotating intermediate bridging member 112 for mounting the applicator support member 110 relative to the mounting means 104 and for at least partially bridging the mouth 108.

Similar to the applicator support member 110, the bridging member 112 is circular in shape having a cut out section forming a sectional ring for partially defining mouth 108. Bridging member 112 also comprises an elongate groove along the width for locating a cable or band.

The bridging member 112 is located between the applicator support member 110 and the mounting means 104 such that the applicator support member 110 rotates relative to the bridging member 112 and the moving means 106. Advantageously, the intermediate rotating bridging member 112 bridges the mouth 108 such that the applicator support member 110 can move from one side of the mouth to the other.

Figure 2:
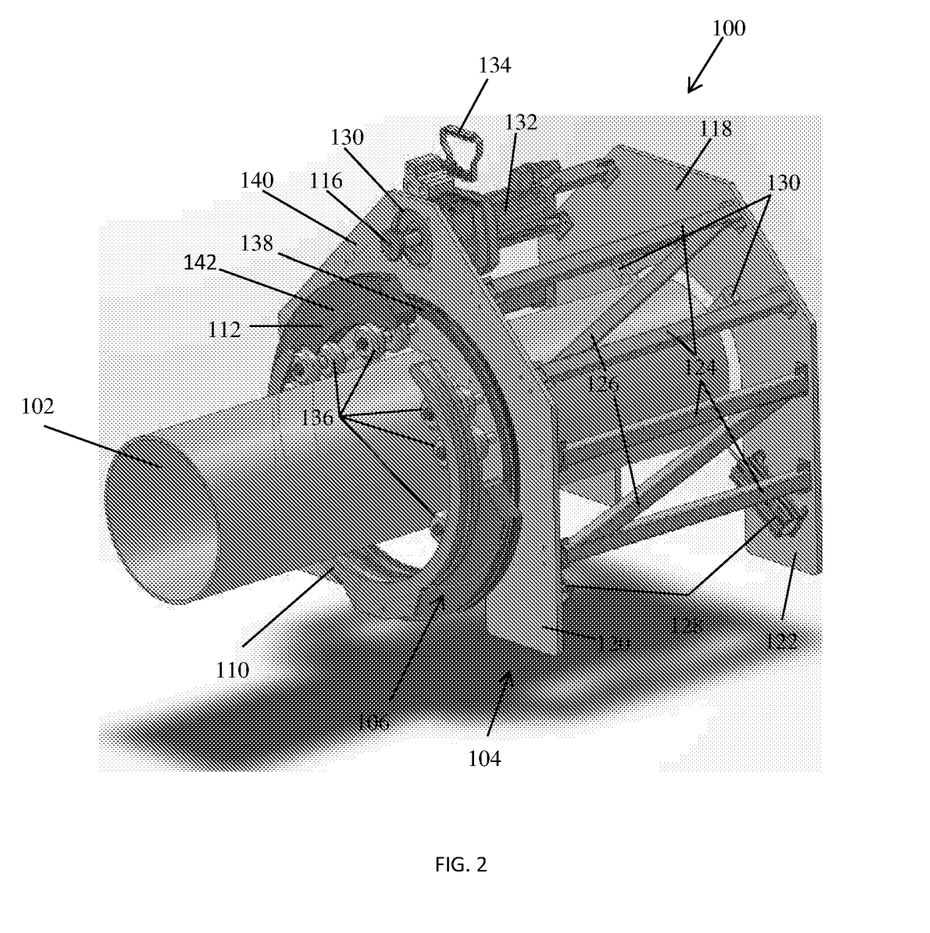
FIG. 2 is a side perspective view of a preferred embodiment of the present invention in a spray starting position.

As best shown in FIG. 2, the applicator support member 110 is moveably extendable beyond the bridging member 112.

The moving means further comprises a pair of gears 114, 116 for varying the speed of rotation of the applicator support member 110 relative to the bridging member 114. Advantageously, the speed of the applicator can easily be varied between low, medium and high speeds.

The moving means may further include a motor 132 for driving gears 114, 116. The motor is located towards the top of the apparatus 100.

The moving means further includes a first band 140 for transferring the drive of motor 132 to the bridging member 112 and a second band 142 for secondary transfer of the drive of the motor 132 from the bridging member 112 to the applicator support means 110. Advantageously, the speed of the applicator support member 110 is increased relative to the speed of the bridging member 112 using the gears 114, 116 and bands 140, 142.

As mentioned above, the apparatus 100 includes a mounting means 104. The mounting means includes a ridged frame 118 for defining a channel for receiving the pipe 102. The frame 118 includes a front panel 120 and a rear panel 122 connected together by multiple frame members 124. Additional support is provided by braces 126. The frame may contain additional frame panels, members or braces in order to increase the rigidity of the frame.

The mounting means further includes adjustable spacers 130 and rams 128. Spacers 130 are located towards the top of frame 118 for locating the pipe 102 relative to the channel such that the pipe 102 is located concentrically with the applicator support member 110 and bridging member 112 of the moving means 106. Advantageously, this ensures that an even coating is applied to the pipe.

Rams 128 are located beneath pipe 102 for clamping the pipe to the apparatus by compressing the bottom of the pipe towards spacers 130. Each ram 128 are located in a position corresponding to a spacer 130 above to facilitate the even distribution of the upward clamping force on the frame. Advantageously, the rams 128 and spacers 130 hold the pipe 102 in position during operation of the apparatus. Additional rams or spaces may be included as required.

The mounting means further includes an aperture 130 for locating motor 132. The aperture is located at the top of the front panel 120 of the mounting means 104.

The moving means further includes a plurality shafts extending from a front face of front panel 120. Each shaft includes a pair of rollers 136. Each roller corresponding to a rotating member of the moving means 110, 112. The shafts are distributed around the opening of the channel defined by the frame such that the rotating members are supported relative to the front of the frame.

Each roller 136 is for supporting and locating a corresponding rotating member 110, 112 relative to the mounting means 104 to facilitate the 360 degree rotation of each of rotating members 110, 112.

The mounting means further includes a handle 134 to facilitate lifting the apparatus. The handle 134 is located at the top of the mounting means 104. Advantageously, the handle 134 allows the apparatus 100 to be lifted on and off the pipe 102 from above.

As can best be seen in FIG. 2, the mounting means 104 further includes a fixed rail 138 for mounting bridging member 112 relative to the pipe 102. Fixed rail 138 is located on a front surface of the front panel 120 of mounting means 104 and about the front end of the channel defined by the frame.

The fixed rail 138 is of a similar shape to the bridging member such that the bridging member can rotate thereon.

The apparatus further includes a controller for controlling the apparatus so that each layer of coating is commenced at a different location on pipe 102. Advantageously, commencing each new layer of coating at a different location prevents build up for the coating at a single location.

The controller is configured to control apparatus 100 so that each coating is applied greater than 360 degrees. Preferably, each coating is applied 361 degrees to ensure that the coating extends at least one full revolution around the pipe. Advantageously, this prevents areas of the pipe from remaining uncoated.

Figure 3:
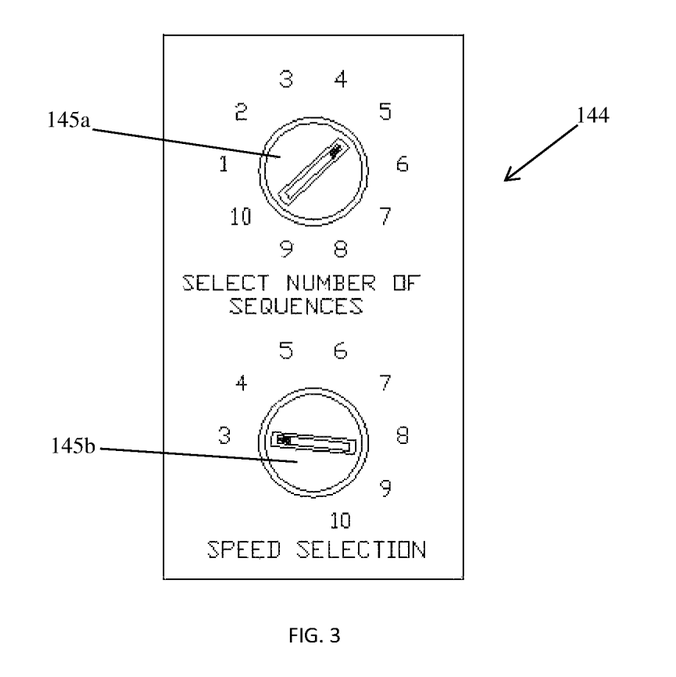
FIG. 3 is a schematic view of a supervisor's panel in the preferred embodiment of the present invention.

The controller includes a supervisor's panel 144 for adjusting the speed of rotation of the moving means and the number of rotations. As can best be seen in FIG. 3, the supervisor's panel 144 includes two switches 145a, 145b for specifying the number of rotations of the moving means and the speed of the moving means. The supervisor's panel 144 is located in a housing structure (not shown) that includes a lock, for example, a cam lock so that it can only be accessed by a supervisor. The supervisor's panel 144 is situated at the back of the mounting apparatus 100. However, the supervisor's panel may be located at any point on the apparatus 100.

The controller further includes at least one operator's panel. Preferably, two operator's panels 146, 148 which are located apart of safety purposes. The first operator's panel 146 is located at the front side of the machine, close to the spray head so that the operator can reach the spray head while operating the panel. As can best be seen in FIG. 4A, the first operator's panel 146 includes four switches: clamp on/off, acid purge, prime and emergency stop.

The second operators' panel 148 is located at the rear of the machine close to the supervisor's panel and includes switches that activate the moving means. The location of the second operator's panel encourages an operator to move away from the applicator mechanism when operating the second operator's panel. As can best be seen in FIG. 4B, the second operator's panel includes four switches: position, start sequence, park and stop.

Figure 4A:
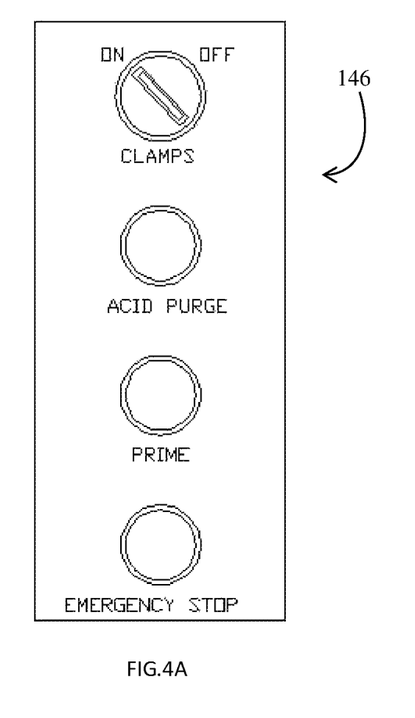
FIG. 4A is a schematic view of a first operator's panel in the preferred embodiment of the present invention.
Figure 4B:
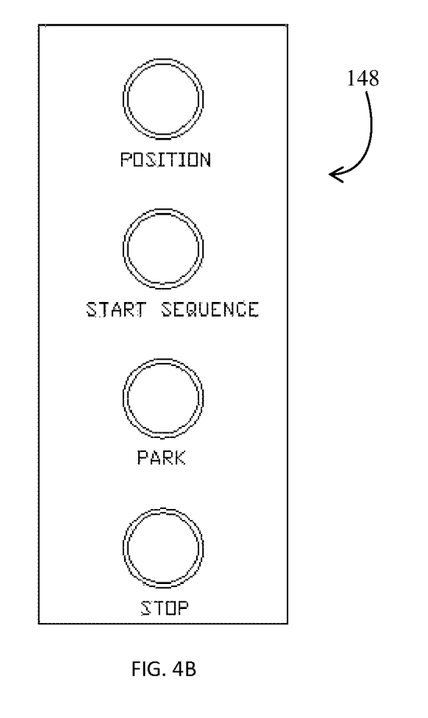
FIG. 4B is a schematic view of a second operator's panel in the preferred embodiment of the present invention.

Both operators' panels 146, 148 include switches in the order that functions are preferably preformed. Advantageously, this minimised the likelihood of functions being performed out of order by the operator.

The method of operation will now be described in detail in the following paragraphs.

In the preferred embodiment of the invention, the method includes the steps of mounting an applicator to the pipe; and, moving the applicator around the pipe to apply the coating.

The step of mounting the applicator involves compressing the pipe using rams by activating the clamp switch on the operator's control panel. The rams apply an upward pressure to the pipe which advantageously secures the pipe relative to a frame. A pressure sensor measures the air pressure of 80 PSI.

The step of moving the applicator involves a series of sequences. The step of moving the applicator involves a first sequence and a second sequence that is then repeated as selected using the supervisors control panel.

Figure 5:
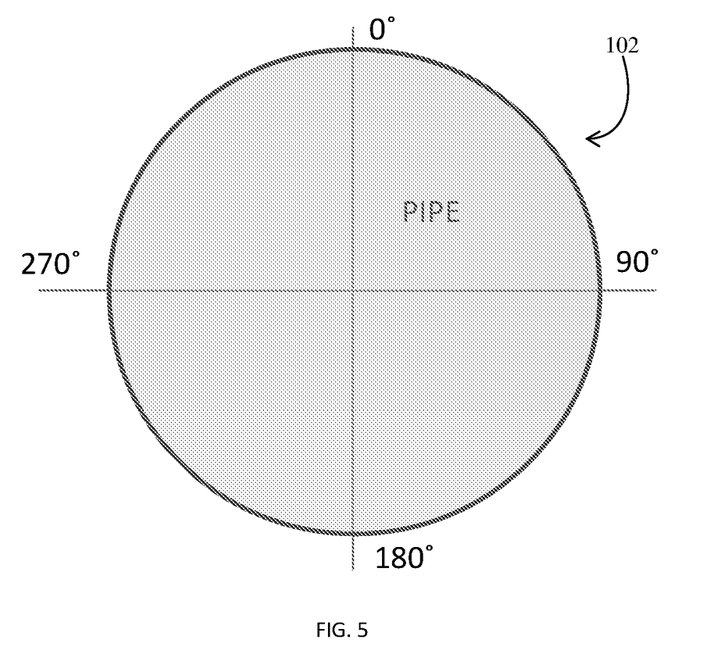
FIG. 5 is a schematic view of a pipe in a preferred embodiment of the present invention.

Each sequence will now be detailed. The positions referred to in the sequences below are based on the position of the applicator relative to the top of pipe 102 as shown in FIG. 5.

Figure 6:
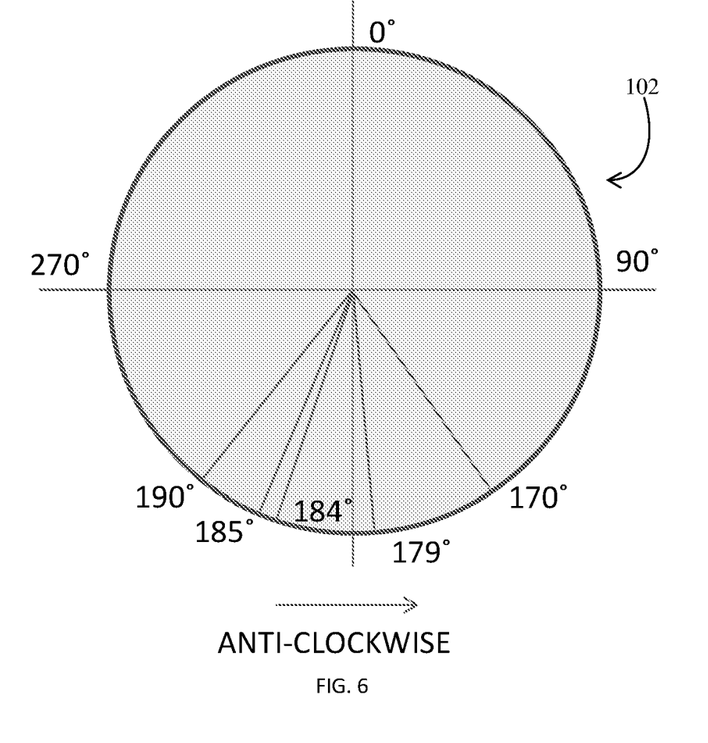
FIG. 6 is a schematic view of positions of the applicator relative to the pipe during a preferred first sequence.

In the first sequence, the applicator rotates in an anti-clockwise direction as indicated in FIG. 6, starting from a location of 190 degrees relative to the top of pipe 102. The applicator then accelerates for 5 degrees to a 185 degree position where the specified full speed of the applicator is reached. The spray head on the applicator is then activated at 185 degrees. One full rotation plus 1 degree (i.e. 361 degrees) of the applicator is completed while the spray head is activated in order to coat the outer surface of the pipe with the coating solution. The spray head then deactivates and the applicator de-accelerates over 5 degrees to a position of 179 degrees relative to the top of the pipe. Finally, the applicator further travels an additional 5 degrees to a final rest position of 170 degrees relative to the top of the pipe.

Advantageously, this ensures at least 1 degree of overlap of the coating being applied to the pipe 102. The spray head sprays at constant speed.

The rotation time from 190 degree to 179 degrees is based on the speed set by the supervisor's panel. The second sequence is substantially the same as the first sequence. However, the applicator now rotations in a clockwise direction.

Figure 7:
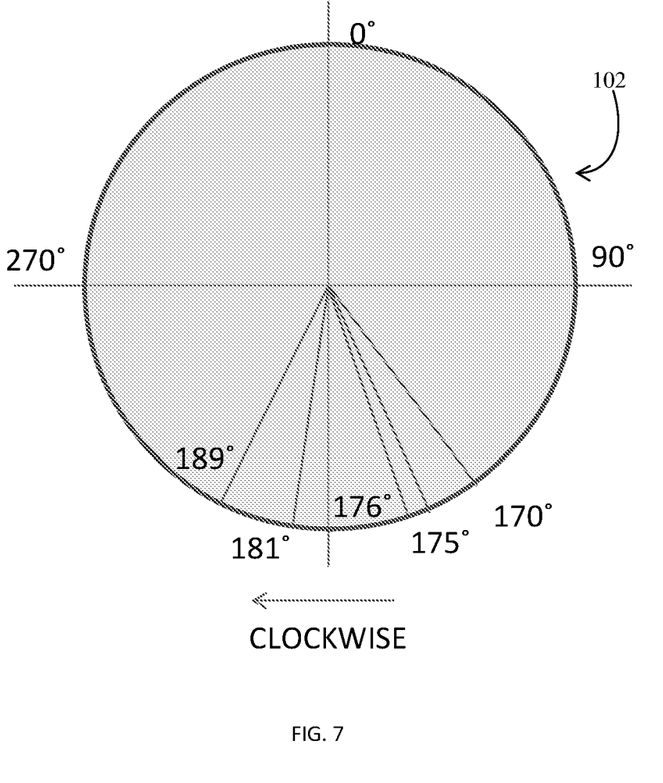
FIG. 7 is a schematic view of positions of the applicator relative to the pipe during a preferred second sequence.

As indicated in FIG. 7, the applicator starts at a position of 170 degrees relative to the top of the pipe (i.e. the ending position of the first sequence), the applicator accelerates for 5 degrees to commence full speed at a position of 175 degrees relative to the top of the pipe. The spray head on the applicator is then activated at 175 degrees and one full rotation plus 1 degree (i.e. 361 degrees) of the applicator is completed while the spray head is activated in order to coat the outer surface of the pipe with the coating solution. The applicator the then deactivates and the applicator de-accelerates over 5 degrees to a position of 176 degrees relative to the top of the pipe. Finally, the applicator travels an additional 5 degrees to a final rest position of 189 degrees relative to the top of the pipe, which is a location 1 degree less than the starting location of the first sequence, ready to commence another sequence.

The rotation time from 170 degree to 189 degrees is based on the speed set by the supervisor's panel and is the same as the first sequence.

The step of moving the applicator preferably involves a series of sequences. In particular, the series of sequences involves alternating between the first sequence and the second sequence until the specified number of sequences set by the supervisor's panel have been completed.

Subsequent sequences commence from the finish position of the preceding sequence. Advantageously, each sequence commences at a different location on the pipe such that a buildup of coating does not occur at a single location.

The method further includes the step of purging the flow line. The flow line is purged with an acid or solvent solution to clear the line of any buildup of coating within the flow line. This step is preferably completed prior to the step of moving the applicator around the pipe.

Purging the flow line involves moving the spray to a 90 degree position relative to the top of the pipe before activating a purge function on the first operators control panel and allowing an acid or solvent solution flow through and clear the line that delivers the coating solution to the applicator.

The method further includes the step of priming the flow line so that the coating flows through the flow line to the spray head. Priming the flow line involves activating a primer function on the first operator's control panel and allowing the coating to flow toward the spray outlet. This step is preferably completed after the purging step and prior to the step of moving the applicator around the pipe.

The reference to any prior art in this specification is not, and should not be taken as an acknowledgement or any form of suggestion that the prior art forms part of the common general knowledge.

Any of the features described herein can be combined in any combination with any one or more of the other features described herein within the scope of the invention.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for applying a coating to a pipe, the apparatus including:
    a mount for mounting the apparatus relative to the pipe;
    an applicator for applying the coating to the pipe; and,
    a moving mechanism configured to move the applicator relative to the mount and around the pipe, the moving mechanism defining a mouth for receiving the pipe,
    wherein the moving mechanism includes:
        a bridge configured to at least partially bridge the mouth so that the applicator can apply coating to the pipe from one side of the mouth to the other, and
        a rotating applicator support member, each of the bridge and the applicator support member having a cut-out section that partially defines the mouth,
    wherein the applicator is mounted on the applicator support member, and
    wherein the applicator support member is rotatable relative to the bridge, and the bridge is rotatable relative to the mount.

2. The apparatus as claimed in claim 1, wherein the bridge is a rotating member.

3. The apparatus as claimed in claim 1, wherein the applicator support member is configured to support rotation of the applicator 360 degrees around the pipe.

4. The apparatus as claimed in claim 1, wherein the rotating applicator support member is the bridge.

5. The apparatus as claimed in claim 1, wherein the moving mechanism includes at least one rotating intermediate member for mounting the applicator support member relative to the mount.

6. The apparatus as claimed in claim 5, wherein the moving mechanism includes a pair of gears for varying the speed of rotation of the applicator support member relative to the at least one rotating intermediate member.

7. The apparatus as claimed in claim 5, wherein the at least one rotating intermediate member is the bridge.

8. The apparatus as claimed in claim 5, wherein the applicator support member is moveably extendable from the at least one rotating intermediate member.

9. The apparatus as claimed in claim 1, wherein the mount includes a fixed rail for mounting the bridge relative to the pipe.

10. The apparatus as claimed in claim 9, wherein the fixed rail and the bridge are concentric sectional rings.

11. The apparatus as claimed in claim 1, wherein the moving mechanism includes a motor for driving the rotation of the applicator relative to the pipe.

12. The apparatus as claimed in claim 1, wherein the applicator includes a spray head for spraying the coating onto the pipe.

13. The apparatus as claimed in claim 1, wherein the mount includes one or more rollers for locating the moving mechanism relative to the pipe.

14. The apparatus as claimed in claim 1, wherein the mount includes one or more rams for clamping the pipe to the apparatus.

15. The apparatus as claimed in claim 14, wherein the one or more rams are located below the pipe for clamping the bottom of the pipe to the apparatus.

16. The apparatus as claimed in claim 1, wherein the mount includes a rigid frame defining a channel for receiving the pipe.

17. The apparatus as claimed in claim 1, wherein the apparatus further includes a controller for controlling the apparatus so that each layer of the coating is commenced at a different location on the pipe.

18. The apparatus as claimed in claim 17, wherein the controller is configured to control the apparatus so that each coating is applied greater than 360 degrees.

19. The apparatus as claimed in claim 1, wherein the apparatus further includes an attachment arrangement to facilitate attachment to a lifting apparatus.

20. The apparatus as claimed in claim 1, wherein the apparatus further includes a coil induction device for heating the pipe.

21. A method of applying a coating to a pipe, the method including:
    mounting an apparatus as claimed in claim 1 to the pipe; and
    moving the applicator around the pipe to apply the coating.

* * * * *